United States Patent [19]

Dreher et al.

[11] Patent Number: 4,660,358
[45] Date of Patent: Apr. 28, 1987

[54] TYING METHOD FOR TYING WINDING MATERIAL AND TYING APPARATUS FOR PERFORMING THE SAME

[75] Inventors: Anton Dreher; Josef Gramer, both of Horb, Fed. Rep. of Germany

[73] Assignee: Hans Deissenberger, Horb am Neckar, Fed. Rep. of Germany

[21] Appl. No.: 780,168

[22] Filed: Sep. 26, 1985

[30] Foreign Application Priority Data

Oct. 18, 1984 [DE] Fed. Rep. of Germany ....... 3438177

[51] Int. Cl.⁴ .............................................. B65B 13/06
[52] U.S. Cl. ..................................................... 53/589
[58] Field of Search ..................... 53/409, 589; 100/26

[56] References Cited

U.S. PATENT DOCUMENTS

| | | | |
|---|---|---|---|
| 3,212,429 | 10/1965 | Fay | 53/589 |
| 3,309,839 | 3/1967 | Lyon | 53/589 X |
| 3,811,244 | 5/1974 | Kilen | 53/589 X |
| 3,995,409 | 12/1976 | Discavage | 53/589 X |
| 4,383,881 | 5/1983 | Sakaki | 53/589 X |

FOREIGN PATENT DOCUMENTS

| | | | |
|---|---|---|---|
| 0140131 | 2/1980 | German Democratic Rep. ... | 53/589 |
| 761377 | 9/1980 | U.S.S.R. ............................... | 53/589 |

*Primary Examiner*—John Sipos
*Attorney, Agent, or Firm*—Bachman & LaPointe

[57] ABSTRACT

A tying method and apparatus for performing the same are proposed, with which the winding material wound on to a winding head can be automatically tied with an enveloping belt. To this end, the enveloping belt is placed round the winding material in an annular enveloping channel up to a retaining plunger. The latter fixes the free end of the enveloping belt, so that the latter can be drawn back again and tensioned by a conveying means, whereby the belt engages on the winding material. The overlapping part of the enveloping belt is welded or bonded by means of a sonotrode. After cutting off the belt, the enveloped winding material can be removed or ejected from the winding head.

7 Claims, 4 Drawing Figures

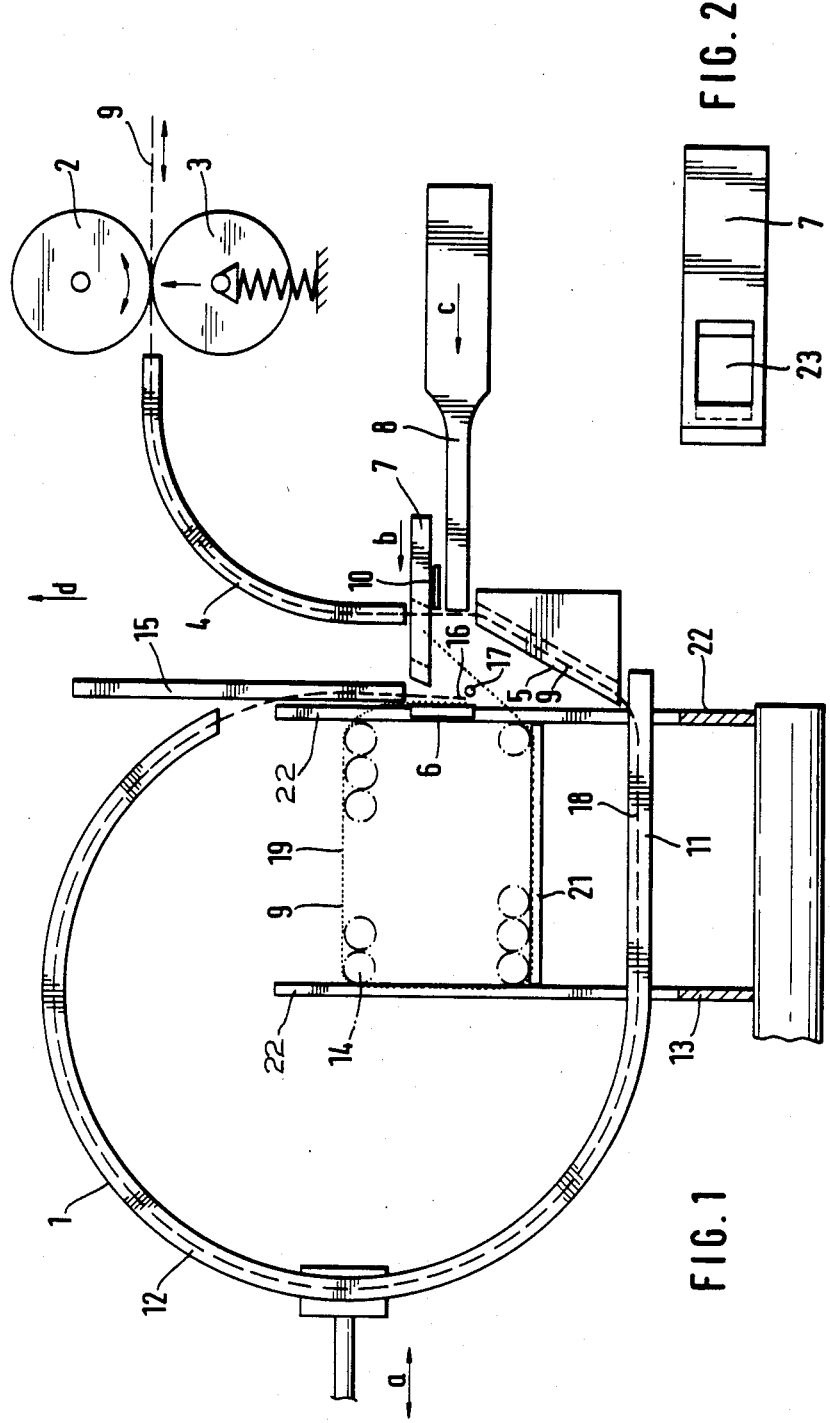

TYING METHOD FOR TYING WINDING MATERIAL AND TYING APPARATUS FOR PERFORMING THE SAME

BACKGROUND OF THE INVENTION

The present invention relates to a tying method according to the preamble of the main claim and to a tying apparatus for performing the same.

The tying of winding material, which has been wound by means of a winding head, preferably takes place by enveloping a number of times with a band or strip or the like, the tying of such winding material has hitherto been carried out manually.

The problem of the present invention is to provide a tying method permitting mechanical tying.

SUMMARY OF THE INVENTION

This problem is solved in accordance with the present invention. The winding material wound on to a winding head is substantially surrounded by an enveloping channel, which places the enveloping band around the winding material. For this purpose, the winding head is slotted laterally and on the winding core, so that the enveloping band can be placed in closely engaging manner around the winding material. After the enveloping band has been placed round the winding material and secured to the end, the enveloping band is drawn back, so that it is placed under tension round the winding material. In the overlapping region of the enveloping band, the latter is then bonded and cut off from the remaining band. The means necessary for tying purposes can then be removed from the winding head and the tied winding material can be removed or ejected. The winding head is preferably slotted four times, so that the tying process can be carried out at three points of the winding material prior to the removal of the latter.

For the purpose of carrying out the tying method, a tying apparatus is proposed, wherein an enveloping device is provided with a substantially annular, displaceable enveloping channel, which has an open area, wherein a conveying means for supplying the enveloping channel and for tensioning the enveloping band is adjacent to the enveloping device and wherein in the open area of the enveloping channel are provided a holding and connecting means. The enveloping channel with its lower part within the winding core is laterally inserted in the winding head, the remaining annular area of the enveloping channel substantially surrounding the winding material. The enveloping band is now inserted in the enveloping channel by means of a conveying device until its free end reaches the holding means. This clamps the free end of the enveloping band, so that the conveying device reverses its conveying direction and can tension the enveloping band. As the enveloping channel is open at its inside facing the winding material, on retraction, the enveloping band is released from the enveloping channel and engages on the winding material. The clamped end of the enveloping band is then bonded or welded to the taut enveloping band, preferably by means of ultrasonic waves produced by a sonotrode. A blade beam then separates the band which has been bonded to form a ring from the remainder of the band. The enveloping channel can be inserted by means of a pneumatic cylinder into the winding head. The remaining means can also be removed from the winding head by corresponding devices, so that the winding head can be opened and the winding material removed or ejected.

The conveying device used preferably comprises two superimposed friction rollers, whereof one is constructed as a drive roller and the other as a resiliently mounted counterpressure roller. The friction rollers draw the enveloping band from a delivery spool or reel or draw back the enveloping band in the opposite direction again on tensioning.

The holding means for fixing the free band end can comprise a swivellable anvil and a retaining plunger, which presses the free band end against the anvil and consequently fixes the same. Following the tying process, the anvil is swivelled away again behind the enveloping band, for which purpose a corresponding drive can be provided.

For the purpose of enveloping the winding material, preference is given to the use of an enveloping band which is elastic within certain limits and which after removing the anvil engages closely to the winding material, as a result of its elasticity.

The winding head is preferably constructed in two-part form and comprises first and second removable side flanges. Following the tying of the winding material, the second side flange is removed and the diameter of the winding core comprising a plurality of individual segments is reduced, so that the winding material can easily be removed or ejected by a tilting process.

Advantageous further developments are characterized in the subclaims.

BRIEF DESCRIPTION OF THE DRAWINGS

The invention is described in greater detail hereinafter relative to non-limitative embodiments and the attached drawings, wherein show:

FIG. 1 A tying apparatus according to the invention in a simplified view.

FIG. 2 A plan view of a retaining plunger.

DETAILED DESCRIPTION OF THE PREFERRED EMBODIMENTS

Figure 3:
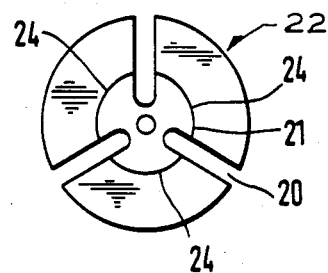
FIG. 3 A side flange with winding core of a winding head.

The tying apparatus shown in FIG. 1 essentially comprises an enveloping channel 1 laterally displaceable in accordance with arrow direction a, a conveying means comprising a drive roller 2 and a counterpressure roller 3 and to which are connected the guide channels 4, 5 and holding and connecting means. The holding means comprises an anvil 6 and a retaining plunger 7, movable in arrow direction b. The connecting means here comprises a sonotrode 8, which can be pressed in accordance with arrow direction c against an enveloping band 9, so that the latter, which overlaps in this area, can be bonded or welded ultrasonically. A blade beam 10 can also be moved in direction c, so that its upper edge cuts off the taut enveloping band 9, which is shown as a dotted line, at the underside of the retaining plunger 7.

Between drive roller 2 and the counterpressure roller 3, resiliently moved against the former, is provided an enveloping band 9, which is removed from a not shown delivery spool or reel. Drive roller 2 moves the enveloping band 9 through a first guide channel 4 and past the retaining plunger 7 and sonotrode 8. The enveloping band 9 now passes into the second guide channel 5, from where it is inserted in the lower, straight part 11 of enveloping channel 1. The enveloping band 9 which has a certain rigidity is then passed round winding material 14 in a winding head 13 in an annularly constructed part 12 of enveloping channel 1. A further vertical channel 15 leads the free end 16 of enveloping band 9 past the anvil 6, until the conveying means is stopped by a proximity switch 17, which is only shown schematically in the drawing. The proximity switch 17 can be constituted by a capacitive or optical switching element in per se known manner.

The stopping of the conveying means simultaneously initiates an actuation of the retaining plunger 7, so that the latter is pressed in the direction of arrow b against the enveloping band 9 located upstream of anvil 6 and leads to the fixing thereof.

Following the fixing of enveloping band 9, the drive roller 2 draws back the enveloping band, indicated in dashed line form, so that it passes out of the enveloping channel 1, which is open at one side, until it is tensioned and is closely placed round the winding material 14 in accordance with the dotted line. The dashed configuration 18 shows the untensioned state, whilst the dotted configuration 19 shows the tensioned state of the enveloping band 9.

The enveloping channel 1, guide channel 5 and straight channel 15 are constructed in U-shaped manner in profile. The open side of these channels faces the winding material, so that on tensioning the enveloping band 9, the latter can pass out of the channels.

Winding head 13 has lateral slots 20 and a winding core 21 subdivided into individual segments. Below winding core 21, the straight part 11 of enveloping channel 1 can be laterally inserted through slots 20 into winding head 13. In this area winding core 21 is interrupted, so that the enveloping band 9 can be placed in unhindered manner round the winding material 14 on tensioning.

The winding head 13 is preferably driven by a stepping motor not shown, which permits a positioned stoppage of the winding head. Thus, slots 20 can be exactly brought into the position permitting a lateral insertion of the enveloping channel 1 in accordance with arrow direction a. The means shown in the drawing to the right alongside the winding head can also be fitted jointly as a displaceable unit, which can be removed from the represented position in accordance with arrow direction d. Thus, it is possible to remove all the means necessary for tying from the winding head 13, so that the tied winding material 14 can be removed without difficulty. The winding material 14 can also be ejected or discharged from winding core 21, if beforehand the right-hand side flange 22 is removed and the diameter of winding core 21 is reduced.

FIG. 2 is a plan view of retaining plunger 7, which has an opening 23, through which is passed the enveloping band 9 supplied.

FIG. 3 shows the side flange of a winding head, which has three individual segments 24 forming winding core 21. For ejecting the winding material, the individual segments 24 are preferably fixed in inwardly pivotable manner to the side flange. When the individual segments 24 are pivoted inwards, by tilting the side flange it is possible to eject the winding material from winding core 21.

Figure 4:
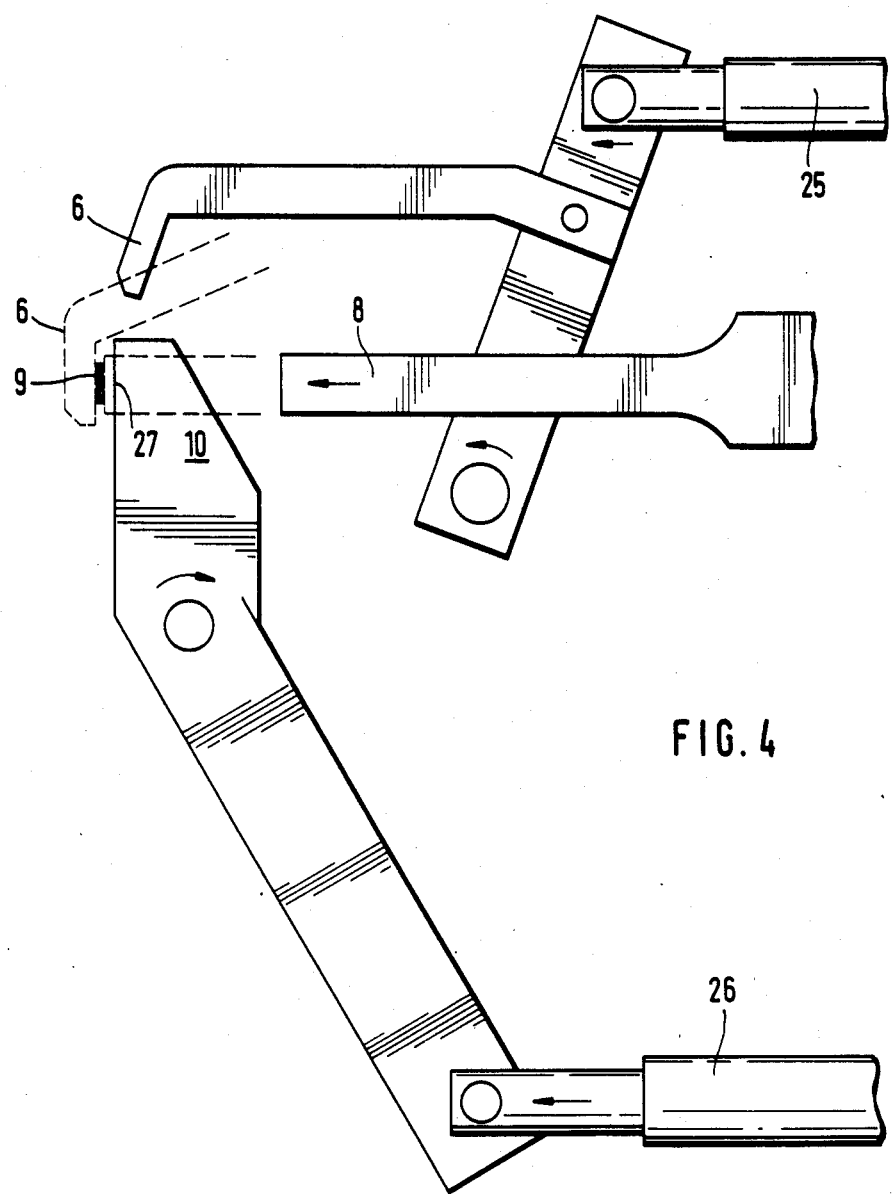
FIG. 4 The retaining means and connecting means for the tying apparatus shown in FIG. 1.

FIG. 4 shows the holding means, connecting means and blade beam 10 in plan view. Anvil 6 can be brought into the broken line position corresponding to that in FIG. 1 by means of a cylinder 25. By means of a not shown further cylinder, it is also possible to bring sonotrode 8 into the position indicated by continuous lines, in which the enveloping band 9 overlapping between anvil 6 and sonotrode 8 is welded or bonded. Following the welding process, the blade beam 10 can be brought into the represented position by means of a further cylinder 26, the enveloping band 9 being cut off by the blade beam 10. The cutting edge 27 of blade beam 10 slides in the area of opening 23 along the underside of the retaining plunger 7, so that the enveloping band 9 is pressed against the edge of opening 23 of retaining plunger 7 and is cut off.

What is claimed is:

1. A tying apparatus for tying winding material onto a winding head with an enveloping band, said winding head having a winding access for said winding material and a lateral slot for said enveloping band, said apparatus comprising:

an enveloping means comprising a continuous, one-piece ring with a substantially annular, displaceable, enveloping channel cross-sectionally open on one side facing the winding material and substantially surrounding the winding material when inserted into the winding head and having a lower straight portion and an upper curved portion;

means for moving the entire enveloping means, said moving means including means for inserting and maintaining the straight portion of the enveloping channel into the lateral slot of the winding head and for placing the curved portion substantially surrounding the winding material;

a conveying means for the supply and tensioning of the enveloping band adjacent to the enveloping means, holding means and connecting means arranged on the same side of the winding head as said conveying means for retaining and joining the enveloping band, while the enveloping channel is displaceably arranged on the side of the winding head opposed to said conveying means;

wherein the enveloping means has an open area between said curved and straight portions thereof and wherein the holding means and connecting means are positioned in the open area; and fixed guide channels between the conveying means and enveloping channel to guide the enveloping band to the enveloping channel and to the holding means.

2. Apparatus according to claim 1 wherein the holding means includes an anvil and a retaining plunger.

3. Apparatus according to claim 1 wherein the conveying means has a drive roller and a counterpressure roller which are constructed as friction rollers and between which is located the enveloping band, wherein the guide channels extend to the friction rollers and lead to the start of the enveloping channel.

4. Apparatus according to claim 2 wherein the holding means includes a pivotable anvil which is in engagement with the enveloping band within the ring formed by the latter, and said retaining plunger is provided on the side of the enveloping band opposite to the anvil wherein said retaining plunger can be pressed against said band.

5. A tying apparatus according to claim 4 wherein the retaining plunger has an opening through which the enveloping band is supplied and wherein a blade beam is arranged in displaceable or swivellable manner in the vicinity of said opening.

6. A tying apparatus according to claim 1 wherein a sonotrode which can be pressed against the overlapping enveloping band is provided as the connecting means.

7. A tying apparatus according to claim 1 wherein the tension on tensioning the enveloping band is so high that there is an elastic extension of said band.

* * * * *